United States Patent [19]
Allen et al.

[11] Patent Number: 5,509,514
[45] Date of Patent: Apr. 23, 1996

[54] GAS CHARGING OF SUSPENSION DAMPER

[75] Inventors: Michael D. Allen, Tipp City; Claude H. Cheatham, West Carrollton; Scott D. MC Coy, Kettering, all of Ohio; Ignacio J. Membrillera, Cadiz, Spain; Robert R. Miles, Spring Valley, Ohio; Leonard A. Mullen, Dayton, Ohio; Robert A. Neal, Miamisburgh, Ohio; Jeffrey S. Stukenborg, Bellbrook, Ohio

[73] Assignee: General Motors Corporation, Detroit, Mich.

[21] Appl. No.: 422,395

[22] Filed: Apr. 14, 1995

[51] Int. Cl.⁶ ............................. F16F 9/06; F16F 9/36
[52] U.S. Cl. ......................... 188/322.17; 188/322.21; 188/269; 188/315
[58] Field of Search ............... 188/322.17, 322.21, 188/318, 269, 315, 314; 267/64.28, 64.15; 92/168, 165 R; 141/4, 5, 349; 277/141, 152, 138, 148, 157, 165, 192, 193, 195, 153, 188 R

[56] References Cited

U.S. PATENT DOCUMENTS

| | | | |
|---|---|---|---|
| Re. 28,329 | 2/1975 | Nicholls | 267/65 |
| Re. 33,715 | 10/1991 | Miura | 188/322.17 |
| 3,139,159 | 6/1964 | Lob | 188/100 |
| 3,513,947 | 5/1970 | Duckett | 188/269 |
| 3,788,630 | 1/1974 | Koller | 267/65 R |
| 3,804,217 | 4/1974 | Keijzer et al. | 188/322 |
| 3,931,961 | 1/1976 | Fader et al. | 188/269 |
| 3,957,259 | 5/1976 | Peddinghaus | 267/64 R |
| 4,044,866 | 8/1977 | Ishida | 188/322 |
| 4,071,057 | 1/1978 | Nagase | 141/4 |
| 4,108,287 | 8/1978 | Kato | 188/315 |
| 4,114,866 | 9/1978 | Kato | 267/64 R |
| 4,166,523 | 9/1979 | Fujii et al. | 188/322.17 |
| 4,189,033 | 2/1980 | Katsumori | 188/269 |
| 4,194,731 | 3/1980 | Marx | 267/64.28 |
| 4,245,825 | 1/1981 | Ohtomo et al. | 188/315 X |
| 4,274,517 | 6/1981 | Kato et al. | 188/315 |
| 4,287,970 | 9/1981 | Eusemann et al. | 188/269 |
| 4,291,788 | 9/1981 | Kato | 188/322.17 |
| 4,335,871 | 6/1982 | Molders | 267/64.28 |
| 4,475,577 | 10/1984 | Cubalchini | 141/349 |
| 4,483,377 | 11/1984 | Cubalchini | 141/349 |
| 4,491,160 | 1/1985 | Axthammer et al. | 141/349 |
| 4,633,983 | 1/1987 | Horvath et al. | 188/322.14 |
| 4,653,618 | 3/1987 | Churchill et al. | 188/332.17 |
| 4,948,104 | 8/1990 | Wirges | 188/322.17 |
| 5,011,121 | 4/1991 | Oriola et al. | 267/64.28 |
| 5,070,970 | 12/1991 | Johnston et al. | 188/315 |
| 5,115,892 | 5/1992 | Yamaoka et al. | 188/322.17 |
| 5,224,573 | 7/1993 | Amemiya et al. | 188/315 |

FOREIGN PATENT DOCUMENTS

| | | | |
|---|---|---|---|
| 2607568 | 6/1988 | France | 188/315 |
| 48-33501 | 10/1973 | Japan . | |
| 56-46135 | 4/1981 | Japan . | |
| 56-42733 | 4/1981 | Japan . | |
| 1459530 | 12/1976 | United Kingdom . | |
| 2049099 | 12/1980 | United Kingdom . | |
| 2115903 | 9/1983 | United Kingdom | 188/322.17 |

OTHER PUBLICATIONS

English Language Abstract for Previously Disclosed Japanese Patent 56–46135.

*Primary Examiner*—Douglas C. Butler
*Attorney, Agent, or Firm*—Jeffrey A. Sedlar

[57] ABSTRACT

A structure and method of gas charging a suspension damper is provided wherein a deflectable seal opens a gas charging passage solely under the application of externally applied gas pressure without requiring additional mechanical deflection device and wherein no charge-passage-specific machining operations of the piston rod are required to provide a gas charging passage around the seal.

7 Claims, 4 Drawing Sheets

GAS CHARGING OF SUSPENSION DAMPER

BACKGROUND OF THE INVENTION

This invention relates to gas charging of suspension dampers. More particularly, a damper seal structure amenable to providing a self-closing charging passage and a method of charging the damper are disclosed.

Various methods and structures for charging a gas chargeable suspension damper are conventionally known. The known methods generally comprise two distinct categories: a first, wherein a mechanical means of deflecting a portion of the seal is utilized and a second, wherein secondary machining of the piston rod is utilized to provide a gas charging passage around the seal. These two previously utilized categories require either mechanically deforming the seal or involve secondary operations to the piston rod to form the required passage.

Although these two categories have undergone various stages of development they continue to be associated with inherently required steps such as mechanically deflecting the seal or additional machining of the piston rod. Both mechanical deformation of the seal and machined charging passages in the rod introduce a potential means of damaging the seal during the assembly process. Accordingly, a new, charge amenable seal structure which avoids the need for conventionally required processing steps is preferable.

SUMMARY OF THE INVENTION

It is therefore, an object of the present invention to provide an improved structure and method of gas charging a suspension damper wherein mechanical deflection of the seal is not required and wherein a charging passage is provided past a standard cylindrical section of the piston rod.

A damper according to the present invention includes a piston, a rod connected to the piston, a first cylindrical tube slidably carrying the piston, a second cylindrical tube positioned about the first cylindrical tube, a rod guide engaging the first cylindrical tube having a rod opening through which the rod extends, a seal cover engaging the second cylindrical tube and having a circular opening through which the rod extends and a seal means positioned between the rod guide and the seal cover's cylindrical opening, including a first leg engaging the rod having an extension engaging the rod guide and including a second leg engaging the seal cover. Preferably, the seal means includes a third leg engaging the rod wherein one of the first or second legs is deflectable by externally applied pressure during gas charging to provide a self-closing opening into the damper's interior.

The present invention also includes a method of gas charging a damper wherein a first seal is assembled around the piston rod such that it is captured between the seal cover and the rod guide, charging the damper wherein the first seal includes a piston rod seal lip that deflects under externally applied pressure, opening a self-closing passage into the damper's interior and subsequently, assembling a second seal around the piston rod.

Through the above described structure and method a gas chargeable suspension damper is provided which does not require machining a charge passage into the piston rod and does not require mechanical deflection of the rod seal by means other than self-closing deflection effected by the application of pressure to the exterior side of the seal means.

DETAILED DESCRIPTION OF THE PRESENTLY PREFERRED EMBODIMENTS

Figures 1, 2:
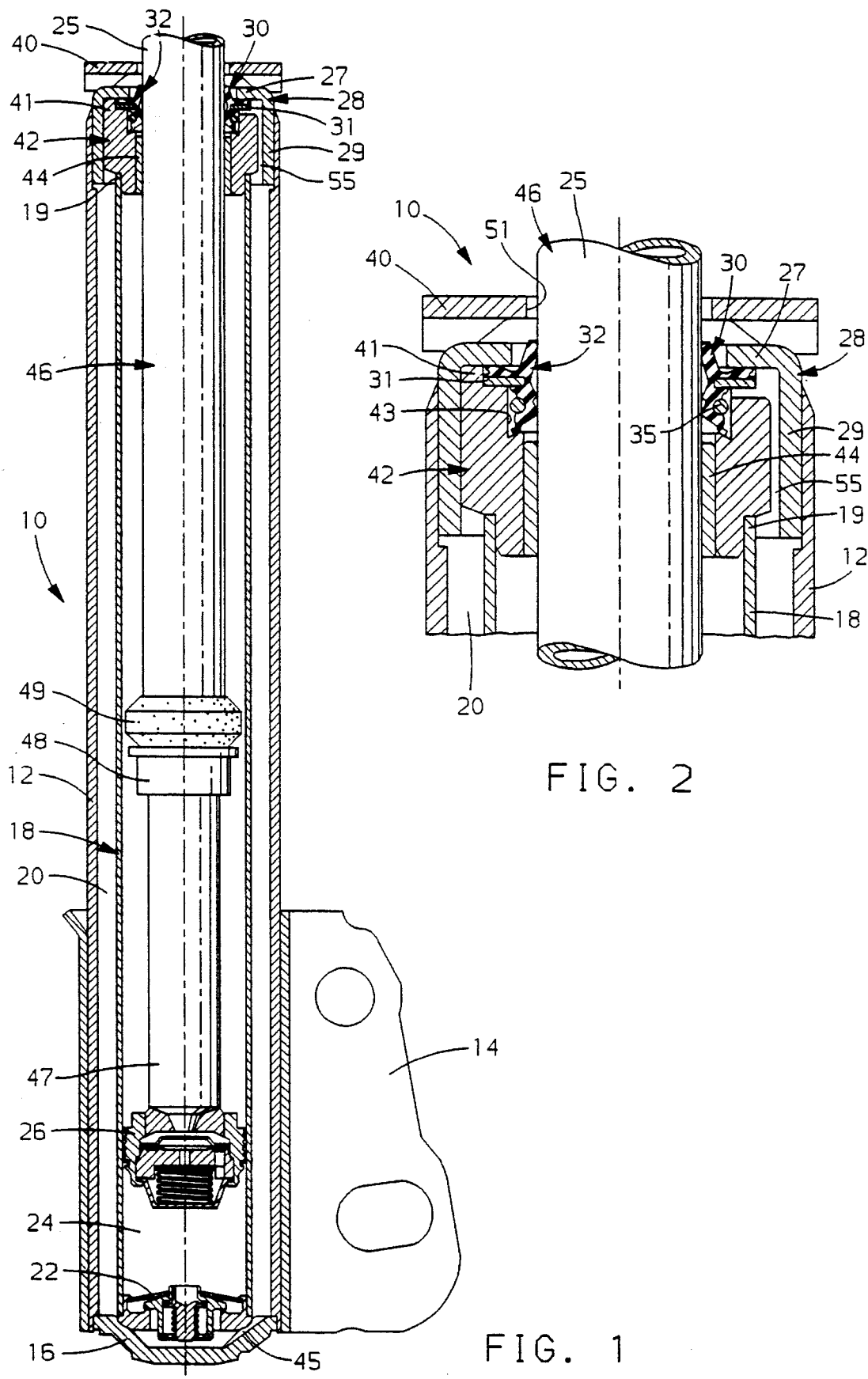
FIG. 1 is a partial, sectional view of a suspension damper assembly which incorporates the present invention.
FIG. 2 is a detail illustration of the piston seal area of the damper of FIG. 1.

Referring to FIG. 1, a suspension damper for a vehicle suspension embodied as strut 10 is illustrated. Strut 10 includes a cylindrical reservoir tube 12 having a mounting bracket 14 secured thereto for connection to a vehicle wheel assembly (not illustrated). The reservoir tube 12 is closed at its lower end by a base cup 16 which is secured thereto. Axially disposed within the reservoir tube is cylinder tube 18. The cylinder tube 18 has a smaller diameter than the reservoir tube 12 and cooperates therewith to provide a reservoir 20 which contains a quantity of oil that is used as a damping medium in the strut 10. The cylinder tube has a base valve 22 secured in the lower end thereof which controls the flow of oil between the reservoir 20 and a compression chamber 24 formed in the cylinder tube 18 beneath a valved piston assembly 26 which is slidably mounted in the cylinder tube 18.

The upper end 19 of cylinder tube 18 is connected to a cylindrical piston rod guide 42 having an inner bushing 44 slidably receiving piston rod 46 which is attached at its lower end 47 to valved piston assembly 26. The piston rod guide 42 is formed with a counterbore 43 in its upper end 41 which receives an annular elastomeric seal 30. Seal 30 provides a seal means and surrounds the piston rod 46 which extends axially therethrough. Seal cover 28 holds seal 30 in counterbore 43 and has inner cylindrical wall 29 captured between piston rod guide 42 and reservoir tube 12. Seal cover 28 also includes annular wall 27. The reservoir tube 12 is secured to the seal cover 28 by a means such as welding. A bumper plate 40 is secured to the top of seal cover 28 by a means such as welding and serves to contact an elastomeric bumper (not illustrated).

The upper end 25 of piston rod 46 extends from strut 10 and is attached to a vehicle through a mounting (not illustrated). A collar 48 is secured to the piston rod 46 within the cylinder tube 18 and supports an elastomeric bumper 49 which is adapted to engage the lower surface of piston rod guide 42 to limit the extension of the strut. Clearance 45 between the base valve 22 and base cup 16 provides passage for the flow of oil between the reservoir 20 and the compression chamber 24 during operation of the strut 10.

In addition to carrying a supply of oil as a fluid within the strut 10, during the assembly process a pressurized gas is introduced through a conventional charging head (not illustrated), into the strut 10 around seal 30. Referring additionally to FIG. 2, the area of seal 30 is illustrated in greater detail. A standard, plain cylindrical section of piston rod 46 extends through seal 30 and is engaged thereby. Seal 30 includes support element 31 for carrying the seal 30 between seal cover 28 and rod guide 42.

Seal 30 also includes elastomeric element 32 which is connected to support element 31 through conventional processing means. Elastomeric element 32 includes primary leg 33 which engages piston rod 46 and includes extension 34 which engages rod guide 42 in counterbore 43. Primary leg 33 carries annular spring element 35 which biases primary leg 33 against piston rod 46 providing enhanced sealing force thereto. Elastomeric element 32 also includes secondary leg 38 which extends into circular opening 51 of seal cover 28 and engages piston rod 46. The elastomeric element 32 of seal 30 also includes charging leg 36 which is positioned between support element 31 and seal cover 28. Charging leg 36 includes a deflectable lip 37 engaging annular wall 27 of seal cover 28.

Upon the application of a gas charging head as is conventionally known in the art and the introduction of high pressure gas through circular opening 51 into chamber 53, the deflectable lip 37 compresses, forming a passage between charging leg 36 and annular wall 27. The opened passage communicates with charging passage 55 which is open from chamber 53 into reservoir 20 of strut 10. Upon the equalization of the pressure inside strut 10 with the externally applied charging pressure from the charging head (not illustrated), the deflectable lip 37 reengages annular wall 27 forming a static fluid gas seal therewith. After pressure equalization the charging head is removed and the assembly is charged and self-sealed. The charging passage 55 also permits the application of pressure feedback into chamber 57 in counterbore 43 assisting in maintaining the seal between primary leg 33 and piston rod 46 and between extension 34 and rod guide 42.

Figure 3:
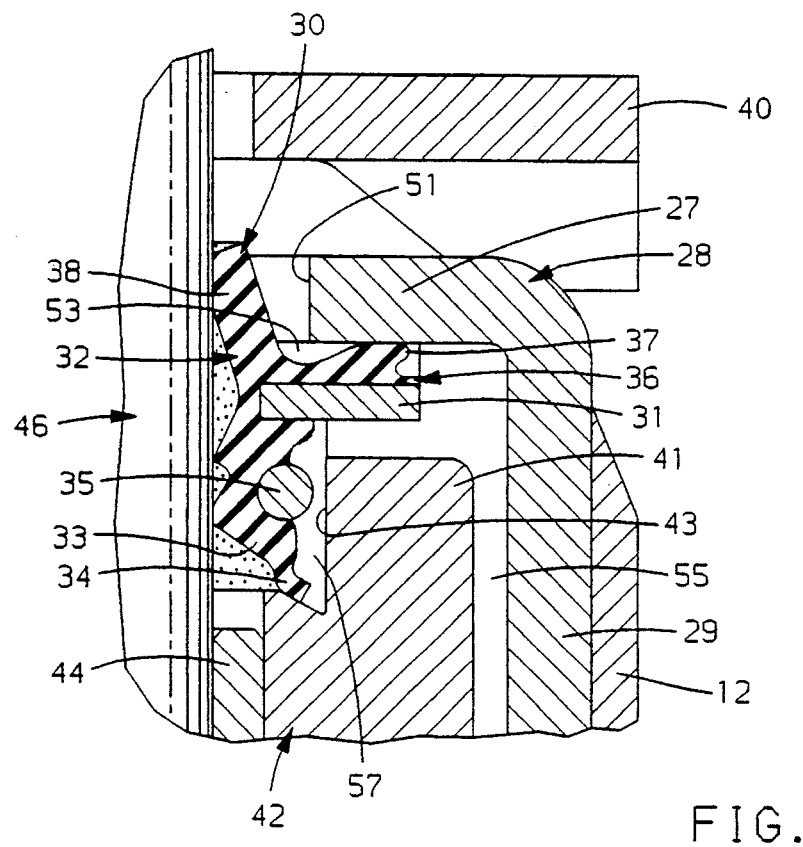
FIG. 3 is a detail illustration of the piston seal area and gas charging passage of FIG. 2.
Figure 4:
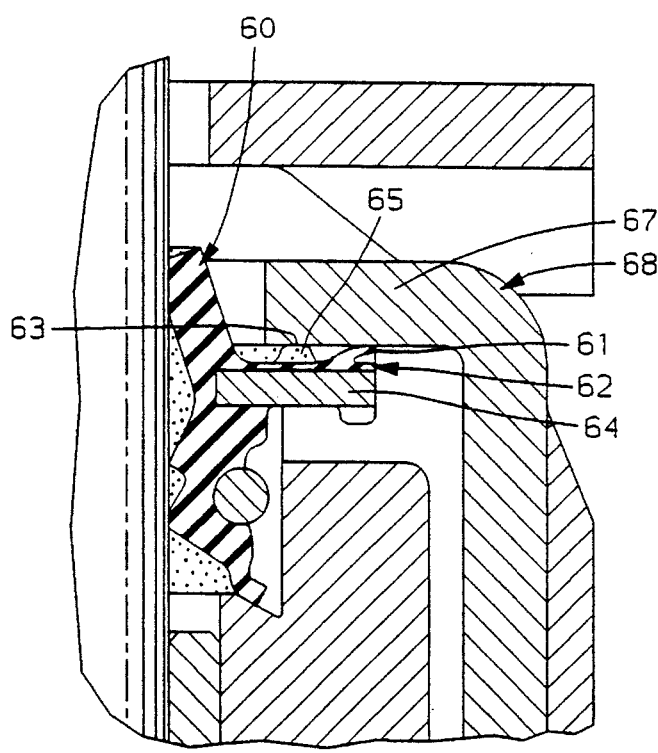
FIG. 4 is an alternative embodiment of the present invention illustrating in detail an area corresponding to that illustrated in FIG. 3.

Referring to FIG. 4, the seal 60 illustrates an alternative embodiment that is substantially of the same construction as seal 30 of FIG. 3 with the exception that a secondary deflectable, annular sealing lip 61 is provided in addition to an annular static seal face 63 as part of the charging leg 62. The static seal face 63 includes slot 65 at one or more locations which, during the gas charging operation, permits gas pressure to flow past the static seal face 63 through slot 65 deflecting the secondary deflectable sealing lip 61 allowing entry of gas into the damper. Upon equalization of the internal and external pressures the secondary deflectable sealing lip 61 reengages annular wall 67 providing a self-sealing assembly. The seal 60 is rigidly trapped, by means of the nonslotted areas of the static seal face 63, between the annular wall 67 of seal cover 68 and the rod guide 64.

Figure 5:
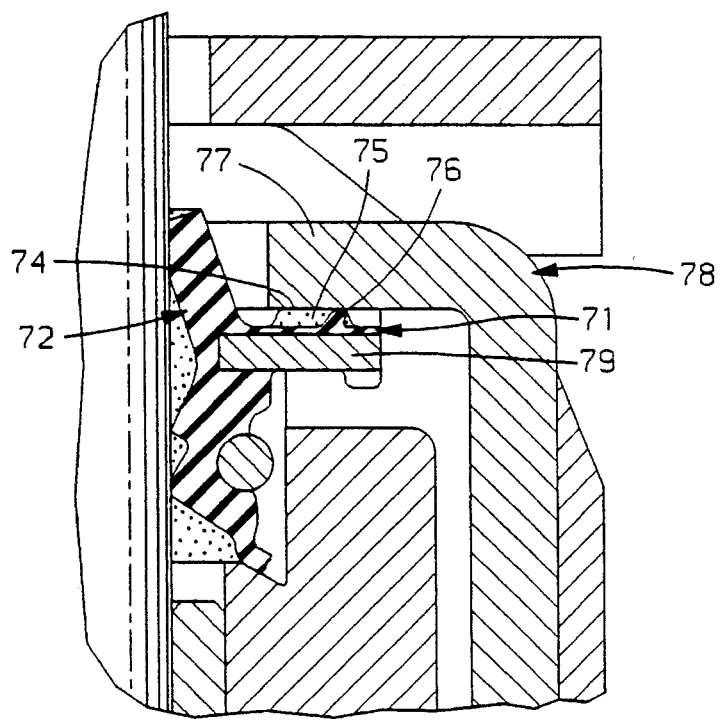
FIG. 5 is an alternative embodiment of the present invention illustrating in detail an area corresponding to that illustrated in FIG. 3.

Referring to FIG. 5, illustrated is an alternative embodiment which is substantially the same as seal 30 of FIG. 3 except that the charging leg 71 of elastomeric element 72 includes a static seal face 74 incorporating void 75 in one or more positions providing access to a reduced wall section forming a deflectable sealing lip 76. During the gas charging operation gas pressure flows into the void 75 of the static sealing face 74 and deflects the deflectable sealing lip 76 allowing entry of gas into the damper. Upon equalization of the internal and external pressures, the deflectable sealing lip 76 reengages annular wall 77 of seal cover 78. Charging leg 71 is rigidly trapped between support element 79 and annular wall 77 in the nonvoided areas of the static sealing face 74.

Figure 6:
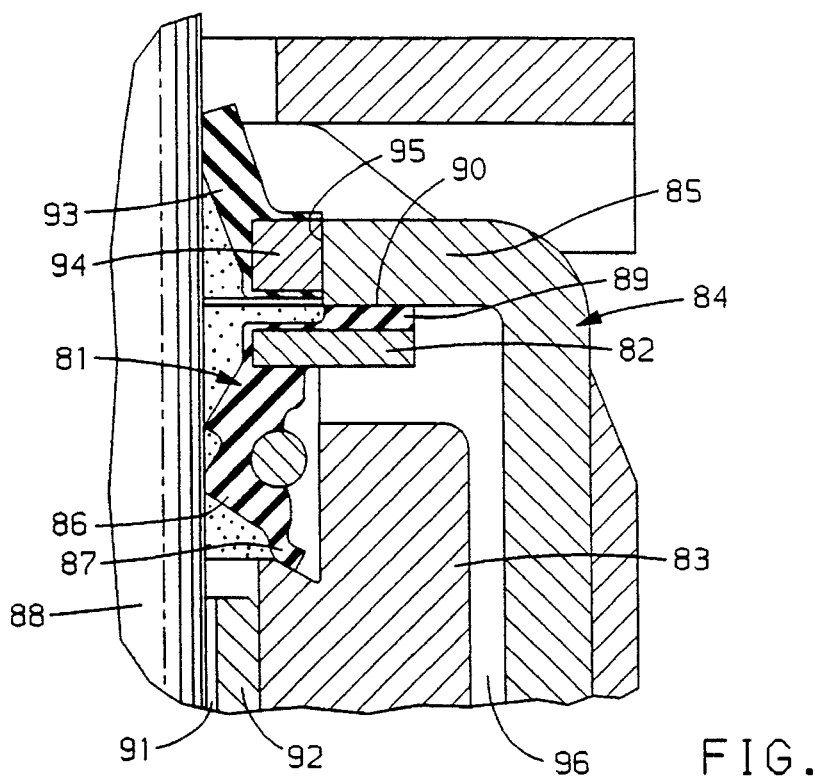
FIG. 6 is an alternative embodiment of the present invention illustrating in detail an area corresponding to that illustrated in FIG. 3.

Referring to FIG. 6, a two-part seal means construction is illustrated. The primary elastomeric seal element 81 engages support element 82 and is captured between rod guide 83 and annular wall 85 of seal cover 84. Primary leg 86 engages piston rod 88 and includes extension 87 which engages rod guide 83. Primary elastomeric seal element 81 also includes secondary leg 89 providing a nondeflectable static seal face 90. During gas charging, primary leg 86 deflects, opening a charging passage along a standard cylindrical section of the piston rod 88 which is open to the damper's interior through groove 91 in bushing 92. After equalization of the internal and external pressures, primary leg 86 reengages piston rod 88 sealing the damper. Subsequent to removal of the charging head a secondary elastomeric seal element 93 with support element 94 is engaged in circular opening 95 of annular wall 85 providing a secondary scraper lip seal, bearing against piston rod 88. Pressure feedback from within the damper is provided through passage 96 maintaining extension 87 against rod guide 83 and primary leg 86 against the piston rod 88.

Figure 7:
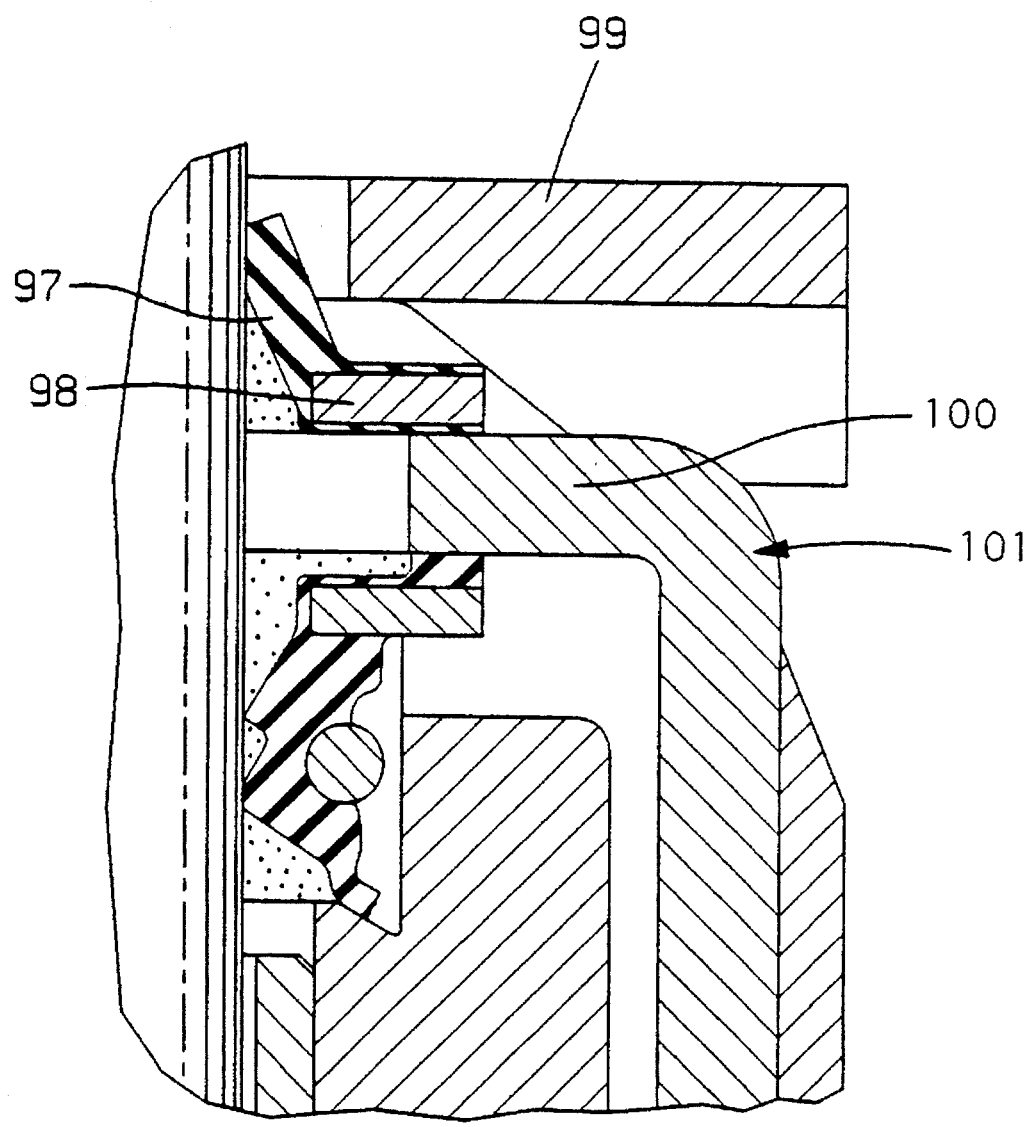
FIG. 7 is an alternative embodiment of the present invention illustrating in detail an area corresponding to that illustrated in FIG. 3.

Referring to FIG. 7, an alternative embodiment with a structure substantially the same as that of FIG. 6 is illustrated with the exception that secondary elastomeric seal element 97 is attached to support element 98 such that it is trapped between bumper plate 99 and annular wall 100 of seal cover 101 or optionally, is integrally molded with bumper plate 99.

By means of the structure of FIGS. 6 and 7 a method of gas charging a suspension damper is provided wherein the primary elastomeric seal element provides a self-sealing deflectable means of permitting the introduction of gas pressure into the damper. Subsequent to the removal of a charging head the secondary elastomeric seal element is positioned in the damper assembly.

What is claimed is:

1. A damper amenable to gas charging comprising:

a piston;

a rod connected to the piston;

a first cylindrical tube slidably carrying the piston and in cooperation with the rod, defining an internal chamber;

a second cylindrical tube positioned about the first cylindrical tube defining a reservoir therebetween;

a rod guide engaging the first cylindrical tube having a rod opening through which the rod extends and a passage in communication with the reservoir;

a seal cover engaging the second cylindrical tube and having a circular opening through which the rod extends; and a seal with a rigid support that is fixed in place and carries an elastomeric element that is deflectable upon an application of a charging pressure about the seal cover and self-sealing upon the equalization of pressure between the charging pressure applied about the seal cover and an internal pressure within the damper, the seal being captured between the rod guide and the seal cover and including a primary leg engaging the rod, the primary leg having an extension engaging the rod guide wherein the internal pressure within the damper communicates through the passage assisting in maintaining the extension sealingly against the rod guide and assisting in biasing the primary leg against the rod, and including a charging leg sealingly engaging the seal cover and the rod guide, and including a scraper lip engaging the rod outside the primary lip;

wherein the charging leg includes an annular static sealing face with a slot and is rigidly trapped in position between the seal cover and the rigid support and includes a secondary deflectable sealing lip wherein when the charging pressure is applied about the seal cover a gas charge is introduced into the damper through the slot of the static sealing face, past the deflectable sealing lip and through the passage of the rod guide.

2. A damper according to claim 1 wherein the secondary deflectable sealing lip is disposed in the slot of the static sealing face.

3. A damper according to claim 1 wherein the secondary deflectable sealing lip is annular and is disposed radially outward on the charging leg from the static sealing face.

4. A method of gas charging a damper that includes a piston slidably carried in a first tube, a rod connected to the piston, a second tube disposed around the first tube, a rod guide engaging the first and second tubes, a first seal having a primary leg engaging the rod and a secondary leg and including a second seal having a scraper lip engaging the rod comprising the steps of:

a. assembling the piston to the rod;
   b. positioning the piston in the first tube and the first tube in the second tube;
   c. engaging the rod guide with the tubes;
   d. assembling the first seal around the rod so that the primary leg engages the rod and the secondary leg engages the rod guide;
   e. charging the damper wherein the first leg deflects during charging and reengages the rod after charging;
   f. engaging the seal cover with the second tube so that the secondary leg is sealingly engaged between the rod guide and the seal cover; and
   g. assembling the second seal onto the seal cover so that the scraper lip engages the rod outside the seal cover.

5. A method according to claim 4 wherein the second seal is assembled onto the seal cover after the seal cover is engaged with the second tube.

6. A damper amenable to gas charging comprising:

a piston;

a rod connected to the piston;

a first cylindrical tube slidably carrying the piston;

a second cylindrical tube positioned about the first cylindrical tube defining a reservoir therebetween;

a rod guide engaging the first cylindrical tube having a rod opening through which the rod extends and a passage in communication with the reservoir;

a seal cover engaging the second cylindrical tube and having a circular opening through which the rod extends; and a first seal with a rigid support fixed in place and carrying an elastomeric element that is deflectable upon an application of a charging pressure about the seal cover and self-sealing upon the equalization of pressure between the charging pressure applied about the seal cover and an internal pressure within the damper, the seal captured between the rod guide and the seal cover and including a primary leg engaging the rod, the primary leg having an extension engaging the rod guide wherein the internal pressure within the damper communicates through the passage assisting in maintaining the extension sealingly against the rod guide and including a secondary leg sealingly engaging the seal cover; and a second seal with a scraper lip sealingly engaging the rod outside the primary leg near the circular opening of the seal cover.

7. A damper amenable to gas charging comprising:

a piston;

a rod connected to the piston;

a first cylindrical tube slidably carrying the piston and in cooperation with the rod, defining an internal chamber;

a second cylindrical tube positioned about the first cylindrical tube defining a reservoir therebetween;

a rod guide engaging the first cylindrical tube having a rod opening through which the rod extends and a passage in communication with the reservoir;

a bushing having a slot and being carried around the rod by the rod guide;

a seal cover engaging the second cylindrical tube and having a circular opening through which the rod extends;

a first seal with a rigid support fixed in place and carrying an elastomeric element that is deflectable upon an application of a charging pressure about the seal cover and self-sealing upon the equalization of pressure between the charging pressure applied about the seal cover and an internal pressure within the damper, the seal captured between the rod guide and the seal cover and including a primary leg engaging the rod with an annular spring biasing the primary leg against the rod the primary leg having an extension engaging the rod guide wherein the internal pressure within the damper communicates through the passage assisting in maintaining the extension sealingly against the rod guide and the primary leg against the rod and including a secondary leg sealingly engaging the seal cover; and a second seal with a scraper lip engaging the rod outside the primary leg;

wherein the primary leg is deflectable when the charging pressure is applied about the seal cover introducing a gas charge into the damper past the primary leg and through the groove in the bushing and past the extension of the primary leg.

\* \* \* \* \*